United States Patent
Li et al.

(10) Patent No.: US 8,665,002 B2
(45) Date of Patent: Mar. 4, 2014

(54) MULTIPLE SWITCHES AND A DELAY CIRCUIT

(75) Inventors: Maodeng Li, Shanghai (CN); Hai Tao, Sunnyvale, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 599 days.

(21) Appl. No.: 12/904,742

(22) Filed: Oct. 14, 2010

(65) Prior Publication Data

US 2012/0092059 A1    Apr. 19, 2012

(51) Int. Cl.
*H03K 17/296* (2006.01)
(52) U.S. Cl.
USPC ......................................................... 327/392
(58) Field of Classification Search
USPC ......................................................... 327/392
See application file for complete search history.

(56) References Cited

U.S. PATENT DOCUMENTS

| 6,737,886 B2 | 5/2004 | Curatolo et al. |
| 6,767,886 B2 * | 7/2004 | Fox et al. ................. 510/513 |
| 7,403,365 B2 | 7/2008 | Sase et al. |
| 7,489,166 B2 | 2/2009 | Honda |
| 7,746,042 B2 | 6/2010 | Williams et al. |
| 2005/0280096 A1 | 12/2005 | McKay et al. |

* cited by examiner

*Primary Examiner* — Daniel Rojas
(74) *Attorney, Agent, or Firm* — Brake Hughes Bellermann LLP (57) ABSTRACT

In a general aspect, an apparatus can include a first switch configured to be coupled to a power source and configured to switch in response to an edge of a control signal. The apparatus can include delay circuit can be configured to produce a delay signal that has an edge corresponding to the edge of the control signal, the edge of the delay signal being offset from the edge of the control signal. The apparatus can also include a second switch can be configured to be coupled to the power source in parallel with the first switch and configured to switch in response to the edge of the delay signal, the second switch having a size smaller than a size of the first switch.

20 Claims, 8 Drawing Sheets

MULTIPLE SWITCHES AND A DELAY CIRCUIT

TECHNICAL FIELD

This description relates to a low supply noise power stage arrangement for a switch regulator.

BACKGROUND

Many known switch regulators have switch circuits that are configured to turn on and turn off at relatively high rates to achieve relatively low overlap conduction losses. However, in known switch regulators, undesirable levels of switching noise (e.g., power noise) can be generated due to parasitic inductance on, for example, power source lines during switching of the switch circuits. The switching noise can be exacerbated by the relatively fast switching speed of the switch circuits. The switching noise, when added to a direct current (DC) voltage of a power source, can exceed breakdown voltages of the components of the switch regulator and/or a load coupled to the switch regulator causing undesirable damage. For some known switch regulators undesirable levels of switching noise can result in an undesirable Absolute Maximum supply Rating (AMR) and/or an undesirable maximum power source voltage specification for the switch regulators. Thus, a need exists for systems, methods, and apparatus to address the shortfalls of present technology and to provide other new and innovative features.

SUMMARY

In a general aspect, an apparatus can include a first switch configured to be coupled to a power source and configured to switch in response to an edge of a control signal. The apparatus can include delay circuit can be configured to produce a delay signal that has an edge corresponding to the edge of the control signal, the edge of the delay signal being offset from the edge of the control signal. The apparatus can also include a second switch can be configured to be coupled to the power source in parallel with the first switch and configured to switch in response to the edge of the delay signal, the second switch having a size smaller than a size of the first switch.

In another general aspect, a method can include initiating a switch time period of a first switch, and can include initiating, during the switch time period of the first switch, a switch time period of a second switch offset from and overlapping with the switch time period of the first switch. The method can include receiving, from a power source, a power signal at the first switch and at the second switch, and producing, starting at a start time of the switch time period of the first switch, a switch output signal based on the power signal and based on a combination of the switch time period of the first switch and the switch time period of the second switch.

In yet another general aspect, an apparatus can include a first switch configured to be coupled to a ground and configured to switch during a switch time period in response to an edge of a control signal and while a negative current is flowing into the first switch. The apparatus can also include a second switch configured to be coupled to the ground in parallel with the first switch. The second switch can be configured to start switching, during the switch time period, in response to an edge of a delay signal offset from the edge of the control signal and while the negative current is flowing into the second switch.

The details of one or more implementations are set forth in the accompanying drawings and the description below. Other features will be apparent from the description and drawings, and from the claims.

DETAILED DESCRIPTION

Figure 1:
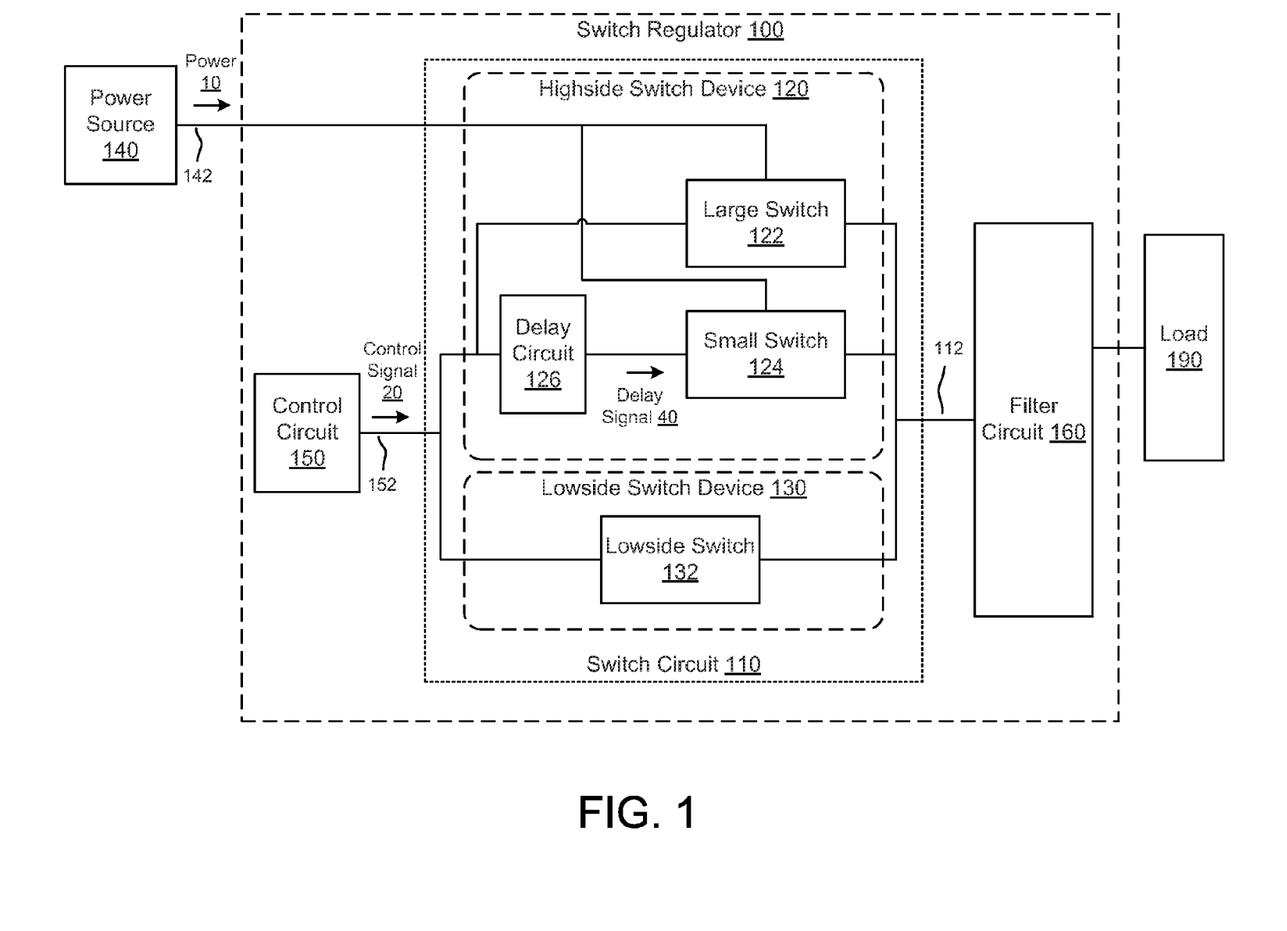
FIG. 1 is block diagram that illustrates a switch regulator that includes a switch circuit with a low supply noise power stage arrangement.

FIG. 1 is block diagram that illustrates a switch regulator 100 that includes a switch circuit 110 with a low supply noise power stage arrangement. The switch circuit 110 is coupled to a power source 140 and a control circuit 150. As shown in FIG. 1, the switch circuit 110 is configured to receive power 10 (e.g., a voltage, a current) from the power source 140 at a power source output 142 (also can be referred to as a power source output node). Also, the switch circuit 110 is configured to receive a control signal 20 (also can be referred to as a switch input signal) from the control circuit 150 at a control circuit output 152 (also can be referred to as a control circuit output node). The control circuit 150 is configured to trigger the switch circuit 110 to provide the power 10, in a switched fashion, to the filter circuit 160 (and to the load 190) from the power source 140.

The control circuit 150 can include any type of control circuitry configured to produce a control signal (i.e., control signal 20) that can trigger switching of the switch circuit 110 within the switch regulator 100. For example, the control circuit 150 can include a signal generator configured to produce a control signal that has a square-wave waveform (e.g., a square-wave waveform with rising and falling edges).

Figure 7:
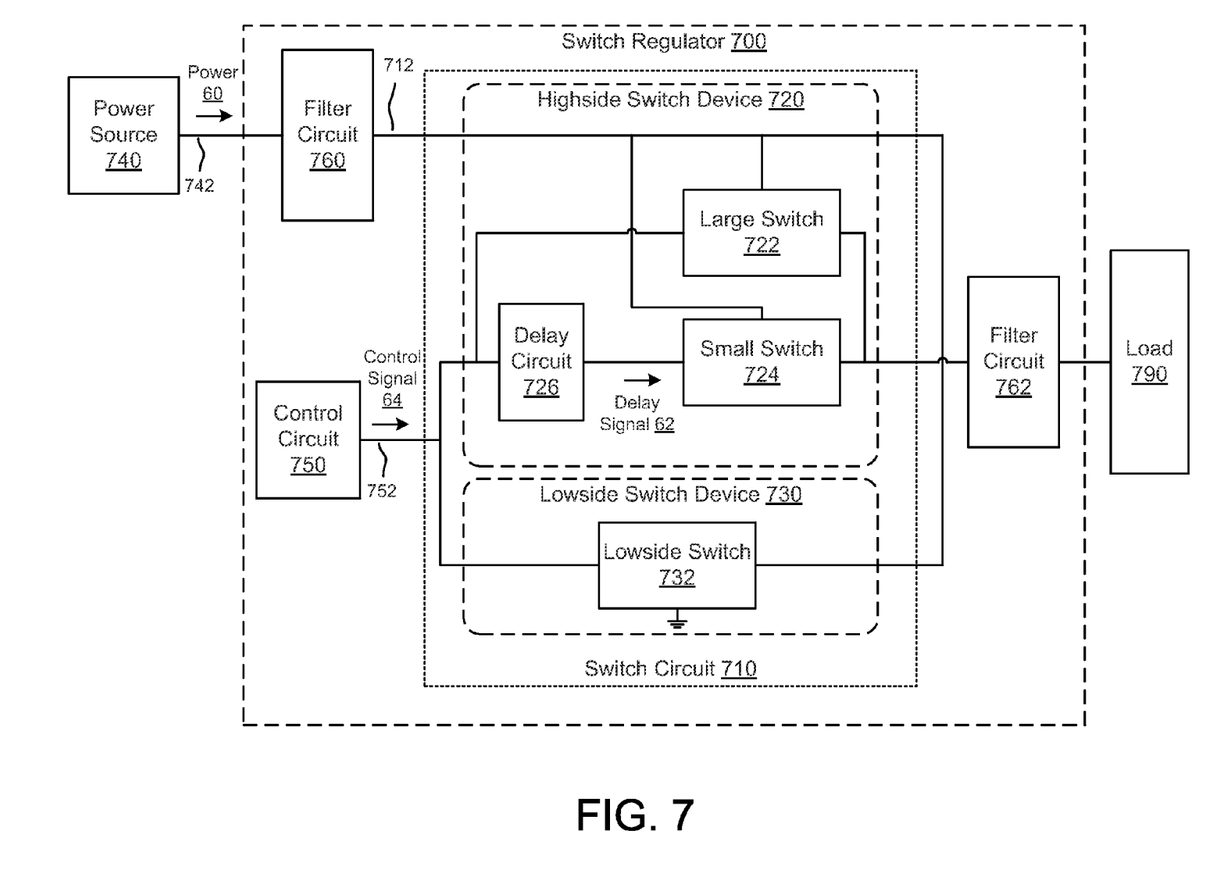
FIG. 7 is a diagram that illustrates a switch regulator that has a switch circuit coupled to filter circuits in a boost regulator configuration.

The switch regulator 100 can be any type of switch regulator that includes a switch circuit 110. In some embodiments, the switch regulator 100 can be referred to as a switched-mode power supply (SMPS). For example, the switch regulator 100 can include a buck regulator, a boost regulator, a buck boost regulator, and/or so forth. In such embodiments, filter circuit (such as filter circuit 160) may be operably coupled to the switch circuit 110 in a configuration different than that shown in FIG. 1. A switch circuit in a boost regulator is shown in FIG. 7 to illustrate one such example. The power source 140 can be any kind of power source. For example, the power source 140 can be a direct current (DC) power source such as a battery, a fuel cell, and/or so forth.

Filter circuit 160 can include any circuitry that can be used in a specific implementation of the switch regulator 100. For example, the filter circuit 160 can include various types of circuitry for the switch regulator 100 including, for example, one or more capacitors, inductors, transformers, transistors, resistors, feedback circuits, and/or so forth. Examples of various types of filter circuitry used in conjunction with a switch circuit are described in connection with, for example, FIGS. 3, 5, and 6A.

As shown in FIG. 1, the switch circuit 110 includes a highside switch device 120 (e.g., a pull-up switch device) and a lowside switch device 130 (e.g., a pull-down switch device). The control signal 20 produced by the control circuit 150 can be configured to trigger each of the highside switch device 120 and the lowside switch device 130 to switch (e.g., change from a closed position to an open position and vice versa, change from an on state to an off state and vice versa). In some embodiments, the control signal 20 can be configured to trigger the highside switch device 120 and the lowside switch device 130 to switch during mutually exclusive (or substantially mutually exclusive) periods of time. For example, the highside switch device 120 can be configured to close/open out of phase and in a periodic fashion with respect to opening/closing of the lowside switch device 130 so that power 10 from the power source 140 can be provided to the filter circuit 160 in a periodic fashion. In some embodiments, the control circuit 150 can include a signal generator configured to produce, for example, a square-wave signal configured to cause the highside switch device 120 and the lowside switch device 130 to each change state in a periodic fashion.

As shown in FIG. 1, the highside switch device 120 includes a large switch 122, a small switch 124, and a delay circuit 126. The large switch 122 and the small switch 124 are coupled in parallel to the power source 140. The large switch 122 and the small switch 124 are also coupled so that they define at least a portion of the switch output 112 (on which a switch output signal can be produced). In some embodiments, the switch output 112 can be referred to as a switch output node. In some embodiments, the large switch 122 and the small switch 124 can be referred to as (and considered) a single switch that has been split into two separate switches (e.g., two separate devices). In some embodiments, the switches (e.g., the large switch 122, the small switch 124) included in the highside switch device 120 can be, for example, p-channel Metal Oxide Semiconductor Field Effect Transistor (MOSFET) transistor devices. In some embodiments, the delay circuit 126 can be, or can include, for example, multiple inverters.

As shown in FIG. 1, the control signal 20 from the control circuit 150 is directly received at the large switch 122, but the control signal 20 from the control circuit 150 is delayed by the delay circuit 126 (which is serially coupled to the small switch 124) to define a delay signal 40 that is received at the small switch 124. In some embodiments, the delay signal 40 can be a time-shifted (e.g., delayed) version of the control signal 20.

As shown in FIG. 1, the lowside switch device 130 includes a single switch (e.g., a single transistor device)—lowside switch 132. In other words, the lowside switch device 130 does not include a split switch. The control signal 20 from the control circuit 150 is also received at (e.g., received directly at) the lowside switch 132. As shown in FIG. 1, the lowside switch 132, which is coupled to the large switch 122 and the small switch 124, can be configured to define at least a portion of the switch output 112. In some embodiments, the lowside switch 132 included in the lowside switch device 130 can be, for example, an n-channel MOSFET device. Although not shown in FIG. 1, lowside switch 132 can be coupled to a ground (e.g., can be grounded).

Although not shown in FIG. 1, each of the switches (i.e., large switch 122, small switch 124, lowside switch 132) can be triggered to switch via a driver. In some embodiments, the driver can be, for example, an inverter. As a specific example, a driver can be disposed between the delay circuit 126 and the small switch 124. The driver can be configured to drive switching of the small switch 124 based on the delay signal 40 from the delay circuit 126. In some embodiments, the driver can be integrated into the delay circuit 126. Drivers are shown in some of the switch circuit embodiments shown below in connection with, for example, FIGS. 5 and 6A.

In this embodiment, the highside switch device 120 is configured to reduce (e.g., dampen) noise that could be introduced into the switch regulator 100 by the highside switch device 120 during switching of the highside switch device 120. In some embodiments, the noise can be referred to as switching noise. The switching noise can include, for example, voltage overshoot from a parasitic inductance related to the power source 140 (e.g., lines from the power source) and/or grounding (e.g., lines to ground). In the embodiment shown in FIG. 1, the parasitic inductance can be between the power source 140 and the switch devices 122 and/or 124. In some embodiments, the voltage overshoot can be proportional to the current from the power source 140 and the magnitude of the parasitic inductance. For example, the voltage overshoot can increase when the magnitude of the parasitic inductance increases and/or the current from the power source 140 increases. In some embodiments, the voltage overshoot can be inversely proportional to a switch time period (i.e., a switching time) of the highside switch device 120. Thus, the voltage overshoot can be reduced when the switch time period of the highside switch device 120 is increased. The relationship between the variables contributing to voltage (V) overshoot can be represented by the following relationship V(overshoot)=L (di/dt), where L is inductance, di is change in current, and dt is change in time. A reduction in, for example, voltage overshoot can result in a higher Absolute Maximum supply Rating (AMR) for the switch regulator 100 and/or a higher maximum power 10 (e.g., maximum output voltage, maximum output current) from the power source 140 that can be used in the switch regulator 100.

In this embodiment, the large switch 122, the small switch 124, and the delay circuit 126 are configured to collectively define a switching characteristic (e.g., a switch time period) of the highside switch device 120 that is configured to reduce (e.g., dampen) switching noise that could be introduced into the switch regulator 100 and may be manifested at, for example, the power source output 142. In other words, if the highside switch device 124 were configured with a single switch (e.g., transistor), similar to the single switch in the lowside switch device 130, undesirable switching noise (from a parasitic inductance) could be introduced into the switch regulator 100 when the highside switch device 120 switches in response to the control signal 20 from the control circuit 150. Specifically, the large switch 122, the small switch 124, and the delay circuit 126 can be configured to define a relatively gradual switching characteristic (compared with a switching characteristic of a single switch device) of the highside switch device 120 that can reduce an undesirable voltage overshoot related to a parasitic inductance (which may be manifested at the power source output 142). In some embodiments, the voltage overshoot can damage one or more portions of the switch, regulator 100 (e.g., a portion of the filter circuit 160).

For example, a portion of the control signal 20 (e.g., a rising edge of the control signal 20) can be defined by the control circuit 150 and sent from the control circuit 150 to the highside switch device 120 to trigger the highside switch device 122 to switch from a closed state (e.g., an on state) to an open state (e.g., an off state). The large switch 122 can be configured to receive the portion of the control signal 20 and can be configured to start switching (during a switch time period) in response to the portion of the control signal 20. The portion of the control signal 20 can also be received at the delay circuit 126, and the delay circuit 126 can be configured to define a portion of the delay signal 40 that corresponds with (but is offset from) the portion of the control signal 20. After the switching of the large switch 122 has been initiated but before the switching of large switch 122 has been completed, the small switch 124 can be configured to receive the portion of the delay signal 40, and can be configured to start switching (during a switch time period) in response to the portion of the delay signal 40. Because the switching of the small switch 124 overlaps with the switching of large switch 122 the overall switching of the highside switch device 120 can have a duration that is greater than the switch time period of each of the large switch 122 and the small switch 124 alone. In other words, the switch time period of the large switch 122 can overlap with the switch time period of the small switch 124 to collectively define a switch time period of the highside switch device 120 that has a duration greater than the switch time period of each of the large switch 122 and the small switch 124 alone. This relatively long switch time period of the highside switch device 120 can reduce (e.g., dampen) undesirable voltage overshoot related to a parasitic inductance. An example of operation of switching of switches included in a switch device, such as the highside switch device 120, in response to a control signal are described in connection with FIGS. 2A through 2F.

As suggested by the labeling of the large switch 122 as a large switch and the labeling of the small switch 124 as a small switch, large switch 122 has a size (e.g., a gate size) that is large relative to a size (e.g., a gate size) of the small switch 124. Specifically, large switch 122 can have a gate width that is larger than a gate width of the small switch 124. Accordingly, the switching characteristics (e.g., switch time period) of large switch 122 can be similar to the switching characteristics of the small switch 124. In some embodiments, the gate size (e.g., a gate width) of the small switch 124 can be more than three times (e.g., 10 times, 20 times, 100 times) smaller than a gate size (e.g., a gate width) of the large switch 122. In some embodiments, the large switch 122 can have a size that is larger than (or smaller than) a size of the small switch 124.

In some embodiments, the switch time period of the large switch 122 can overlap with the switch time period of the small switch 124 to collectively define a switch time period of the highside switch device 120 that has a duration greater than the switch time period of a switch that has a size equal to (substantially equal to) a size of the large switch 122 plus a size of the small switch 124. For example, a switch time period of the highside switch device 120 that includes the large switch 122 and the small switch 124 can have a duration greater than the switch time period of a single switch that has a gate width equal to (or substantially equal to) a gate width of the large switch 122 plus a gate width of the small switch 124.

FIGS. 2A through 2F illustrates switching of a large switch and switching of a small switch included in a switch device of a switch regulator in response to a control signal. Also, switching noise characteristics of a power source output are also shown. As shown in FIGS. 2A through 2F, time is increasing to the right.

Although the behavior of the components of the switch regulator are described in connection with FIGS. 2A through 2F as making transitions at specified voltages and at specified times, when implemented (e.g., implemented using Metal Oxide Semiconductor Field Effect Transistor (MOSFET) devices), the transitions of the components may occur slightly before or slightly after the specified voltages and/or specified times. Specifically, variations in threshold voltages, processing variations, temperature variations, switching times of devices, circuit transition delays, and/or so forth can result in conditions (e.g., non-ideal conditions) that can trigger transitions of components of the switch regulator slightly before or slightly after the specified voltages and/or times.

Figure 2A:
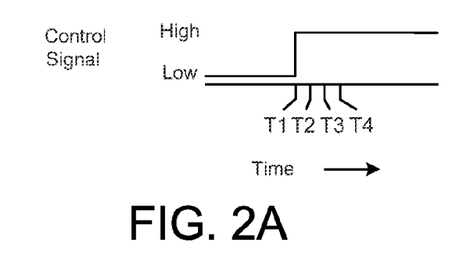
FIG. 2A is a graph that illustrates a waveform of a control signal, according to an embodiment.

FIG. 2A is a graph that illustrates a waveform of a control signal, according to an embodiment. The control signal can be produced by, for example, the control circuit 150 shown in FIG. 1. The control signal shown in FIG. 2A can be, for example, the control signal 20 shown in FIG. 1. As shown in FIG. 2A, the control signal changes from a low state to a high state at time T1. In other words, the control signal has a rising edge at time T1.

Figure 2B:
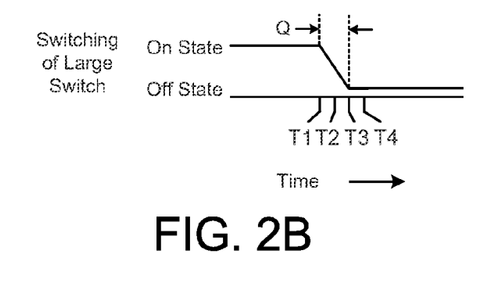
FIG. 2B is a graph that illustrates switching of a large switch in response to the control signal shown in FIG. 2A.

FIG. 2B is a graph that illustrates switching of a large switch in response to the control signal shown in FIG. 2A. The large switch can be, for example, the large switch 122 shown in FIG. 1. In this embodiment, the large switch is configured to switch from a high state to a low state in response to the rising edge of the control signal (which occurs at time T1 as shown in FIG. 2A) starting at time T1. As shown in FIG. 2B, the large switch is configured to switch from the high state to the low state during a switch time period Q between times T1 and T3.

Figure 2C:
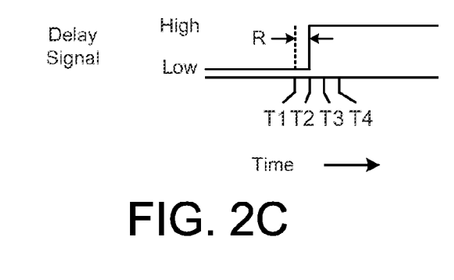
FIG. 2C is a graph that illustrates a delay signal defined based on the control signal shown in FIG. 2A.

FIG. 2C is a graph that illustrates a delay signal defined based on the control signal shown in FIG. 2A. The delay signal can be, for example, the delay signal 40 shown in FIG. 1. The delay signal can be produced by a delay circuit (e.g., delay circuit 126 shown in FIG. 1) based on the control signal (e.g., control signal 20 shown in FIG. 1). As shown in FIG. 2C, the delay signal has a rising edge at time T2 that corresponds with the rising edge of the control signal at time T1 shown in FIG. 2A. In this embodiment, the delay signal is offset from the control signal by a time period R (which can be referred to as an offset or as an offset time period).

Figure 2D:
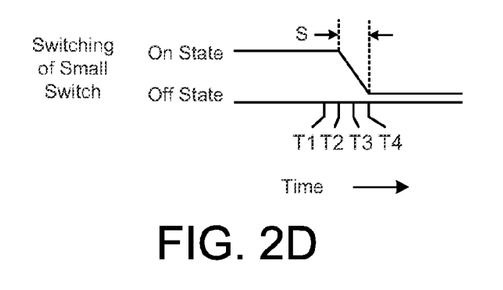
FIG. 2D is a graph that illustrates switching of a small switch in response to the delay signal shown in FIG. 2C.

FIG. 2D is a graph that illustrates switching of a small switch in response to the delay signal shown in FIG. 2C. The small switch can be, for example, the small switch 124 shown in FIG. 1. In this embodiment, the small switch is configured to switch from a high state to a low state in response to the rising edge of the delay signal (which occurs at time T2 as shown in FIG. 2C) starting at time T2. As shown in FIG. 2D, the small switch is configured to switch from the high state to the low state during a switch time period S between times T2 and T4. In some embodiments, the large switch and the small switch included in the switch circuit can be, for example, p-channel MOSFET devices configured to change from an on state to an off state in response to a rising edge of a control signal.

As shown in FIG. 2D, the switch time period S of the small switch overlaps with the switch time period Q of the large switch (shown in FIG. 2B). Specifically, after the switching of the large switch has been initiated, but before the switching of large switch has been completed (shown in FIG. 2B), the small switch can be configured to receive the portion of the delay signal (shown in FIG. 2C), and can be configured to start switching (during the switch time period S) in response to the portion of the delay signal. Accordingly, the switch time period S of the small switch overlaps with the switch time period Q of the large switch (shown in FIG. 2B) between times T2 and T3. In this embodiment, a portion of the switch time period S between times T3 and T4 of the small switch falls outside of the switch time period Q of the large switch (shown in FIG. 2B). Also, a portion of the switch time period Q between times T1 and T2 of large switch (shown in FIG. 2B) falls outside of the switch time period S of the small switch.

As shown in FIGS. 2B and 2D, the switching characteristics of the large switch and the small switch are approximately the same. Specifically, the switch time period Q of the large switch shown in FIG. 2B is equal to (or substantially equal to) the switch time period S of the small switch shown in FIG. 2D. In some embodiments, the switch time period Q of large switch can be equal to (or substantially equal to) the switch time period S of the small switch because a gate length of large switch can be equal to (or substantially equal to) a gate length of the small switch. In some embodiments, the switch time period Q of the large switch can be equal to (or substantially equal to) the switch time period S of the small switch even though a gate width of the large switch may be substantially different from a gate width of the small switch.

Figure 2E:
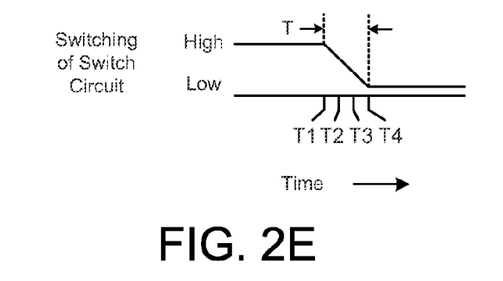
FIG. 2E is a graph that illustrates switching of a switch device that includes the small switch referenced in FIG. 2D, and the large switch referenced in FIG. 2B.

FIG. 2E is a graph that illustrates switching of a switch circuit that includes the small switch (referenced in FIG. 2D) and the large switch (referenced in FIG. 2B). Specifically, the graph in FIG. 2E illustrates that the switch circuit has a switch time period T that starts at time T1 and ends at time T4. The start time of the switch circuit at time T1 corresponds with the time at which the large switch starts switching (e.g., starts switching from the on state) as shown in FIG. 2B. The end time of the switch circuit at time T4 corresponds with the time at which the small switch stops switching (e.g., switches to the off state) as shown in FIG. 2D. In some embodiments, the switching of the switch circuit can define a switch output signal at a switch output (e.g., switch output 112 shown in FIG. 1).

Because the switching of the small switch overlaps with the switching of large switch, the overall switch time period T of the switch circuit (shown in FIG. 2E) can have a duration that is greater than the switch time period Q of the large switch (shown in FIG. 2B) and is greater than the switch time period S of the small switch (shown in FIG. 2D). In other words, the switch time period of the large switch can overlap with the switch time period of the small switch to collectively define a switch time period of the switch circuit that has a duration greater than the switch time period of each of the large switch and the small switch alone. The large switch, the small switch, and the delay signal define a relatively gradual switching characteristic (compared with the switching characteristic of the small switch or the large switch alone) of the switch circuit that can reduce an undesirable voltage overshoot related to a parasitic inductance. An example of voltage overshoot is shown in FIG. 2F.

Figure 2F:
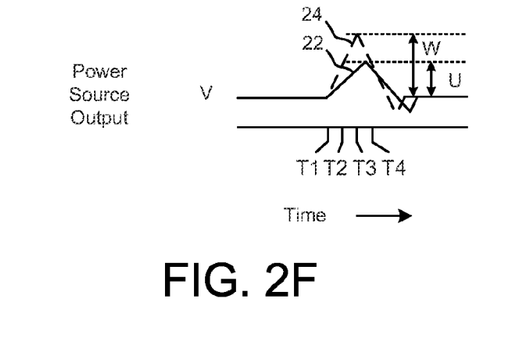
FIG. 2F is a graph that illustrates voltage overshoot related to a power source including the switch device referenced in FIG. 2E.

FIG. 2F is a graph that illustrates voltage overshoot related to a power source including the switch circuit (referenced in FIG. 2E). As shown in FIG. 2F, an output voltage of the power source has a voltage overshoot 22 with a magnitude U. The voltage overshoot with the magnitude U is achieved using a combination of the switching characteristics (e.g., switching time periods) of the large switch (shown in FIG. 2B) and the small switch (shown in FIG. 2D).

Also, an output voltage of the power source without using the combination of the switching characteristics of the large switch and the small switch is shown in FIG. 2F with dashed lines. Specifically, the output voltage of the power source has a voltage overshoot 24 with a magnitude W when the switch circuit includes only a single switch that has a size equal to (or substantially equal to) a size of large switch plus a size of the small switch. As shown in FIG. 2F, a duration of the voltage overshoot 24 is shorter than a duration of the voltage overshoot 22. However, the magnitude U of the voltage overshoot 22 is smaller than the magnitude W of the voltage overshoot 24.

In some embodiments, the magnitude U of the voltage overshoot 22 can be less than or equal to 30% smaller (from ~10V to ~7V) than the magnitude W of the voltage overshoot 24. In some embodiments, the magnitude U of the voltage overshoot 22 can be greater than 30% of the magnitude W of the voltage overshoot 24. For example, the magnitude U of the voltage overshoot 22 can be approximately 7 V, and the magnitude W of the voltage overshoot 24 can be approximately 10 V.

Although not shown in FIGS. 2A through 2F, the control signal can also have a falling edge. Accordingly, the large switch and the small switch can be configured to switch from an off state to an on state in response to the falling edge. Although not shown, graphs similar to those shown in FIGS. 2A through 2F can be produced for a large switch and a small switch included in the switch circuit that are, for example, n-channel MOSFET devices configured to switch between an on state and an off state in response to rising and falling edges of a control signal (and a delay signal based on the control signal). More details related to splitting of pull-down devices such as n-channel MOSFET devices are described in connection with FIGS. 5 and 6A.

Referring back to FIG. 1, the load 190 being powered by the switch regulator 100 can include various types of loads. For example, the load 190 can be any type of circuit (or portion thereof) configured to operate based on power provided by the switch regulator 100. For example, the load 190 can be a microprocessor, a logic module, a radio-frequency (RF) amplifier, a digital signal processor (DSP), a logic gate, an application-specific integrated circuit (ASIC), a field programmable gate array (FPGA), and/or so forth. In some embodiments, the load 190 can be any combination of a digital circuit and an analog circuit.

As described above, the switching time of the highside switch device 120 is increased so that the undesirable switching noise related to the switch regulator 100 can be reduced. In some embodiments, the switching time of the highside switch device 120 may be increased (e.g., lengthened) without affecting the performance of the switch regulator 100 in an undesirable fashion. For example, the switching time of the highside switch device 120 (with the large switch 122 and the small switch 124 shown in FIG. 1) may be 1 to 10 nanoseconds (ns). If including a single switch with a size that is the equal to (or substantially equal to) a size of the large switch 122 plus a size of the small switch 124, the switching time of the highside device 120 may be 0.5 to 5 ns. The difference in switching time, however, of the highside switch device 120 with the split switches may result in a significant reduction (e.g., a reduction of several volts) in switching noise associated with the switch regulator 100 and the slower switching time may be negligible (or tolerable) from a performance perspective. Thus, in some embodiments, the tradeoff of switching time for reduced switching noise (e.g., voltage overshoot) may be desirable in some switch regulator applications.

Although not shown in FIG. 1, in some embodiments, the highside switch device 120 can include a split switch with more than two switches. If including more than two switches, the highside switch device 120 can include any combination of switch size (e.g., large-size switch, medium-size switch, small-size switch). For example, the highside switch device 120 can include a split switch with one large switch and two small switches. Each of the small switches can have a small size relative to the large switch (e.g., a gate width that is more than 10 times smaller than a gate width of the large switch). In some embodiments, the small switches can be the same size, or can be different sizes. The switching of each of the small switches can be offset from the switching of the large switch. Thus, each of the small switches can be triggered to switch based on a delay signal. In some embodiments, each of the small switches can be configured to switch in response to different delay signals (e.g., delay signals that are offset from one another).

Although not shown in FIG. 1, in some embodiments, the low side switch device 130 can also include a split switch (that can include two or more switches). Examples of a low side switch device 130 with a split switch are described in connection with, for example, FIGS. 5 and 6A.

Figure 3:
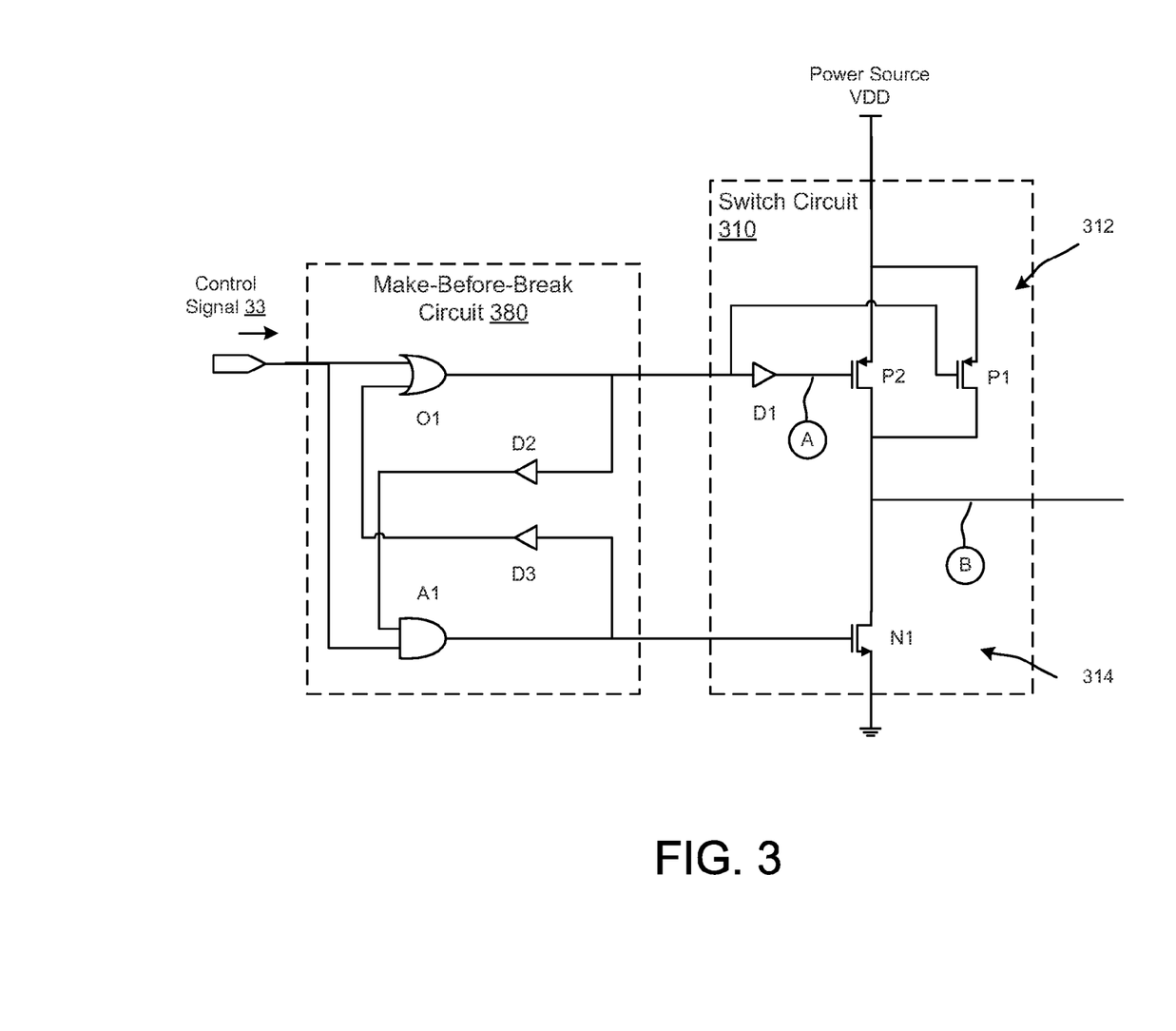
FIG. 3 is a circuit diagram that illustrates a switch circuit and a make-before-break circuit.

FIG. 3 is a circuit diagram that illustrates a switch circuit 310 and a make-before-break circuit 380. The switch circuit 310 is configured to switch between states (e.g., a first state and a second state, an off state and an on state) in response to a control signal 33 received at the switch circuit 310 via the make-before-break circuit 380. The make-before-break circuit 380 includes an OR gate O1, and AND gate A1 and delay circuits D2 and D3. In some embodiments, the delay circuits D2 and/or D3 can include, or can be, inverters.

As shown in FIG. 3, the switch circuit 310 includes a split p-channel MOSFET device. Specifically, the switch circuit 310 includes p-channel MOSFET device P1 coupled in parallel with a p-channel MOSFET device P2 (at their respective sources) to a power source VDD. The p-channel MOSFET device P1 can be referred to as PMOS P1, and the p-channel MOSFET device P2 can be referred to as PMOS P2. An output of a delay circuit D1 is coupled to a gate of PMOS P2. PMOS P1, PMOS P2, and delay circuit D1, can collectively function as a highside switch device 312 (e.g., a pull-up device) of the switch circuit 310.

The switch circuit 310 also includes an n-channel MOSFET device N1, which can be referred to as NMOS N1, that has a drain coupled to the drains of PMOS P1 and PMOS P1. NMOS N1 functions as a lowside switch device 314 (e.g., a pull-down device) of the switch circuit 310. Although not shown in FIG. 3, each of the switches (i.e., PMOS P1, PMOS P2, NMOS N1) can be triggered to switch via a driver (e.g., a driver circuit).

As shown in FIG. 3, the drains of PMOS P1 and PMOS P1 and the drain of NMOS N1 are coupled at net B. In this embodiment, net B is an output of the switch circuit 310. Thus, the output of the switch circuit 310, net B, is coupled to the highside switch device 312 and the lowside switch device 314 of the switch circuit 310.

In this embodiment, the control signal 33 can be configured to cause the highside switch device 312 and the lowside switch device 314 to each alternately open and close. By alternately opening and closing, power can be delivered at net B from the power source VDD and net B can be grounded during alternating periods of time. Specifically, power can be delivered through the output of the switch device 310 (at net B) from the power source VDD via the highside switch device 312 when the highside switch device 312 is closed (and the lowside switch device 314 is open), and the output of the switch device 310 (at net B) can be grounded when the lowside switch device 314 is closed (and the highside switch device 312 is open). In some embodiments, the switching circuit 310 can be configured to switch (e.g., change states, alternate between states) at, for example, a kilohertz (kHz) (e.g., 0.1 kHz, 1 kHz, 10 kHz) rate, a megahertz (MHz) (e.g., 1 MHz, 10 MHz, 100 MHz) rate, etc.

In this embodiment, the split PMOS device can reduce switching noise on the power source VDD, when, for example, the highside switch device 312 changes from the closed state to an open state. Specifically, switching of PMOS P2 is offset from the switching of PMOS P1 by the delay circuit D1 so that the overall switching of the highside switch device 312 can be relatively long and can dampen switching noise. The PMOS P1 is configured to respond directly to the control signal 33, but the control signal 33, however, is delayed by delay circuit D1 (shown as net A) before being applied to the gate of PMOS P2. Thus, switching (during a switch time period) of PMOS P2 is offset (by a delay induced by the delay circuit DI) from switching (during a switch time period) of PMOS P1. The offset between the switching the PMOS P to an PMOS M1 can be defined so that the switching (during a switch time period) of PMOS P2 can overlap with the switching (during a switch time period) of PMOS P1. In this embodiment, the NMOS N1 is configured to respond directly to the control signal 33 after being received via the make-before-break circuit 380.

Figure 4:
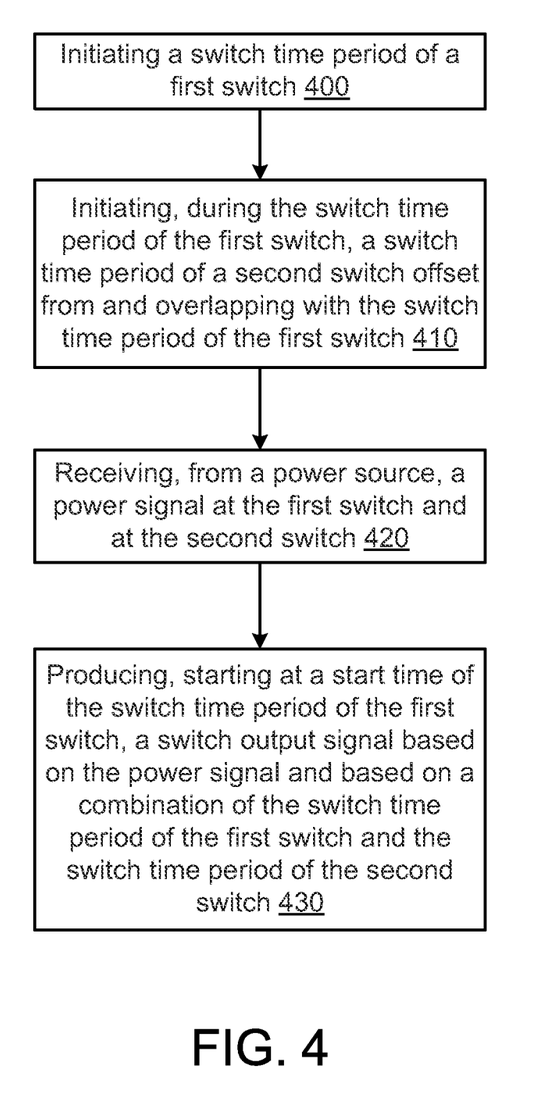
FIG. 4 is a flowchart that illustrates a method related to a switch circuit of a switch regulator, according to an embodiment.

FIG. 4 is a flowchart that illustrates a method related to a switch circuit of a switch regulator, according to an embodiment. In some embodiments, the switch circuit of the switch regulator can be, for example, the switch circuit 110 of the switch regulator 100 shown in FIG. 1.

A switch time period of a first switch is initiated (block 400). The first switch can be included in a switch circuit of a switch regulator such as the switch circuit 110 of the switch regulator 100 shown in FIG. 1. The switch time period of the first switch can be initiated in response to a control signal.

During the switch time period of the first switch, a switch time period of a second switch offset from and overlapping with the switch time period of the first switch is initiated (block 410). The second switch can be included in a switch circuit of a switch regulator such as the switch circuit 110 of the switch regulator 100 shown in FIG. 1. Specifically, the switch time period of the second switch can be offset from the switch time period of the first switch by a delay circuit. The switch time period of the second switch can be triggered based on a control signal that is delayed by the delay circuit. In some embodiments, first switch and the second switch can be configured to collectively define a relatively gradual switching characteristic that can reduce an undesirable voltage overshoot related to a parasitic inductance. In some embodiments, the second switch can have a gate size (e.g., a gate width) that is smaller than a gate size (e.g., a gate width) of the first switch.

A power signal is received at the first switch and at the second switch from a power source (block 420). In some embodiments, the first switch and the second switch can be coupled in parallel to the power signal. In some embodiments, the power signal can include a voltage output and a current output.

Starting at a start time of the switch time period of the first switch, a switch output signal is produced based on the power signal and based on a combination of the switch time period of the first switch and the switch time period of the second switch (block 430). In some embodiments, the switch output signal can be delivered to regulator circuitry associated with a switch regulator and/or to a load coupled to a switch regulator.

Figure 5:
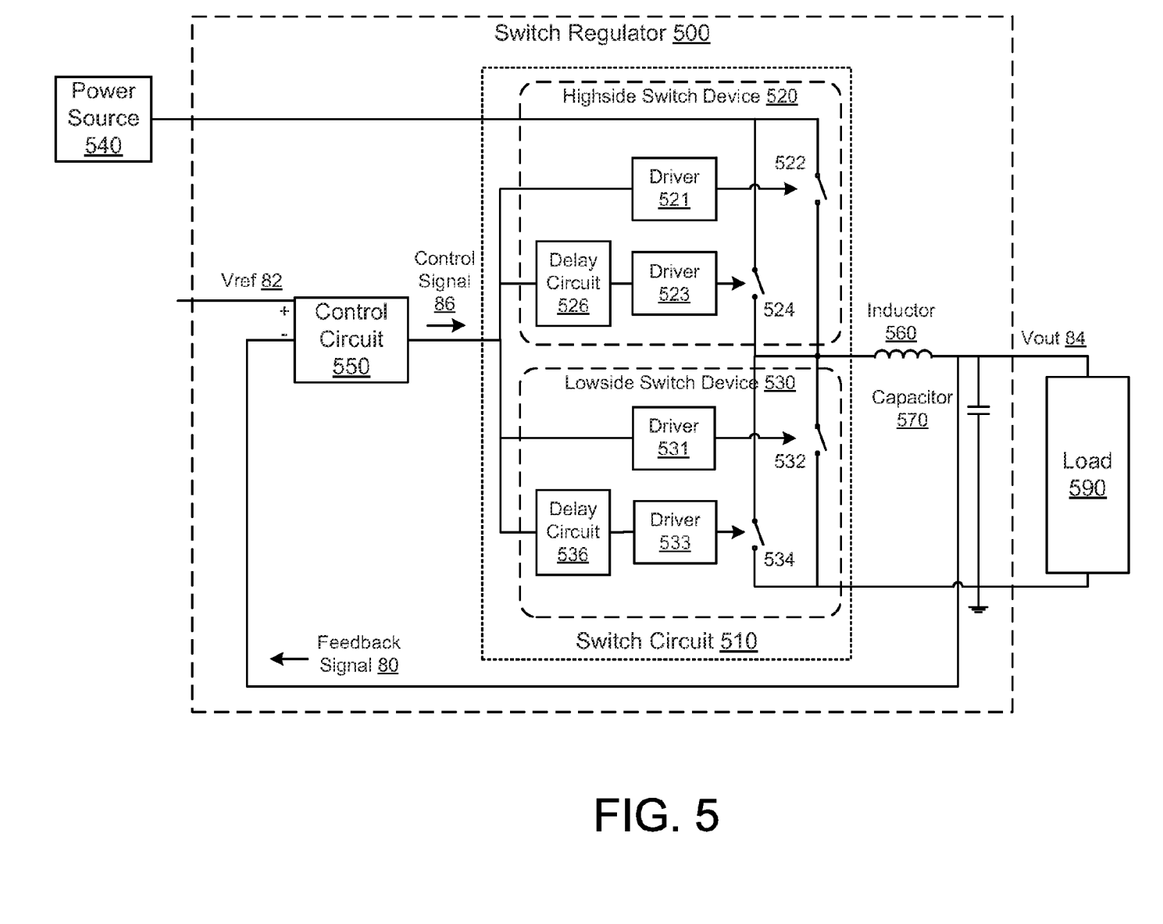
FIG. 5 is a block diagram that illustrates a switch regulator that has a highside switch device with a split switch and a lowside switch device with a split switch.

FIG. 5 is a block diagram that illustrates a switch regulator 500 that has a highside switch device 520 with a split switch and a lowside switch device 530 with a split switch. The highside switch device 520 includes a large switch 522 and a small switch 524 coupled to a delay circuit 526 through (as represented by the arrow) a driver 523. The large switch 522 of the highside switch device 520 is also coupled to (as represented by the arrow) a driver 521. The lowside switch device 530 includes a large switch 532 and a small switch 534 coupled to (as represented by the arrow) a delay circuit 536 through a driver 533. The large switch 532 of the lowside switch device is also coupled to (as represented by the arrow) a driver 531. In some embodiments, each of the drivers 521, 523, 531, and 533 can be, for example, one or more inverters configured to drive switching of the respective switches 522, 524, 532, and 534.

As shown in FIG. 5, the highside switch device 520 and lowside switch device 530 are included in a switch circuit 510 that is coupled to a power source 540. Switching of the highside switch device 520 and the lowside switch device 530 can be triggered by a control circuit 550 using a control signal 86.

In this embodiment, the switch regulator 500 is a buck converter that includes an inductor 560 and a capacitor 570. As shown in FIG. 5, an output of the switch circuit 510 is coupled to the inductor 560. The switch regulator 500 has an output, shown as Vout 84, that is coupled to a load 590. Thus, the switch regulator 500 is configured to provide power to the load 590 (from the power source 540). Also, as shown in FIG. 5, the control circuit 550 is configured to trigger switching of the highside switch device 520 and lowside switch device 530 based on a reference voltage (shown as Vref 82) and based on a feedback signal 80.

Figure 6A:
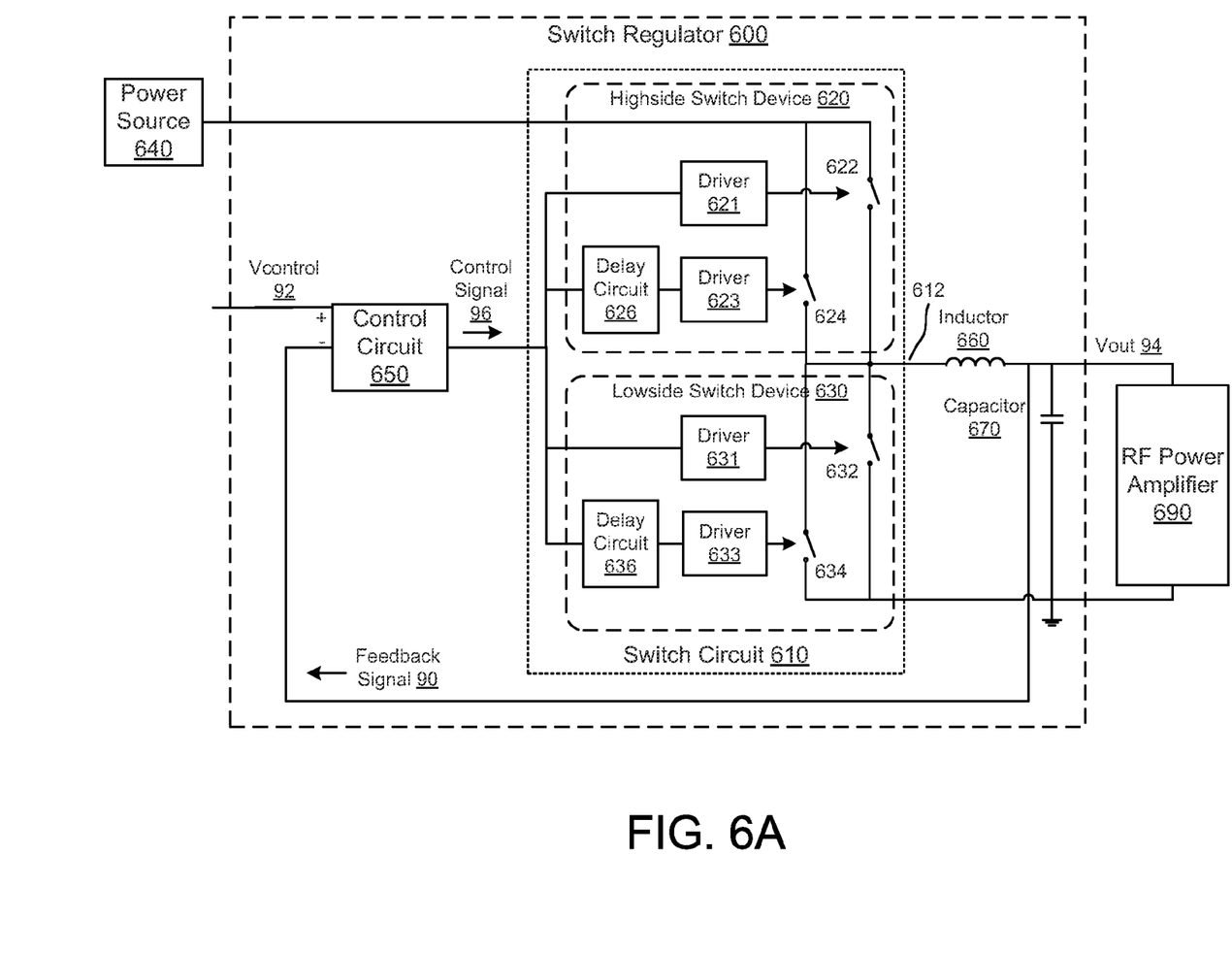
FIG. 6A is a block diagram that illustrates a switch regulator that has a radio-frequency (RF) power amplifier as a load.

FIG. 6A is a block diagram that illustrates a switch regulator 600 that has a radio-frequency (RF) power amplifier 690 as a load. The switch regulator 600 has a highside switch device 620 with a split switch and a lowside switch device 630 with a split switch. The highside switch device 620 includes a large switch 622 and a small switch 624 coupled to a delay circuit 626 through (as represented by the arrow) a driver 623. The large switch 622 of the highside switch device 620 is also coupled to (as represented by the arrow) a driver 621. The lowside switch device 630 includes a large switch 632 and a small switch 634 coupled to a delay circuit 636 through (as represented by the arrow) a driver 633. The large switch 632 of the lowside switch device is also coupled to (as represented by the arrow) a driver 631. The highside switch device 620 and lowside switch device 630 are included in a switch circuit 610 that is coupled to a power source 640. Switching of the highside switch device 620 and the lowside switch device 630 can be triggered (via the drivers 621, 623, 631, and 633) by a control circuit 650 using a control signal 96.

In this embodiment, the switch regulator 600 is a buck converter that includes an inductor 660 and a capacitor 670. As shown in FIG. 6A, a switch output 96 of the switch circuit 610 is coupled to the inductor 660. The switch regulator 600 has an output, shown as Vout 94, that is coupled to the RF power amplifier 690. Thus, the switch regulator 600 is configured to provide power to the RF power amplifier 690 (from the power source 640). In some embodiments, the RF power amplifier 690 can be an RF power amplifier included in, for example, a cell phone device, a tablet computer, a personal digital assistant (PDA), a laptop, a radio, and/or so forth. The control circuit 650 is configured to trigger switching of the highside switch device 620 and lowside switch device 630 based on a control voltage (shown as Vcontrol 92) and based on a feedback signal 90.

In this embodiment, the switch regulator 600 is configured to provide power at Vout 94 based on changing power requirements of the RF power amplifier 690. For example, the power requirements of the RF power amplifier 690 can be at a first level during a first time period and at a second level during a second time period (mutually exclusive from the first time period).

As a specific example, the power requirements of the RF power amplifier 690 can vary based on a distance that the RF power amplifier 690 is to transmit a signal (e.g., transmit a signal to a base station, transmit a signal to another device). If the RF power amplifier 690 will transmit a signal a relatively long distance, the switch regulator 600 can be configured to provide a relatively large power (e.g., a relatively high voltage) that will enable transmission of the signal over the relatively long distance. If the RF power amplifier 690 will transmit a signal over relatively short distance, the switch regulator 600 can be configured to provide a relatively low power (e.g., a relatively low voltage) that will enable transmission of the signal over the relatively short distance. Thus, power can be efficiently provided to the RF power amplifier 690 to transmit signals depending on signaling distance rather than needlessly providing excess power to the RF power amplifier 690 when transmitting signals over, in particular, relatively short distances.

In this embodiment, the switch regulator 600 is configured to provide power at Vout 94 based on the power requirements of the RF power amplifier 690 using Vcontrol 92. Thus, the output at Vout 94 can be configured to track Vcontrol 92. In some embodiments, Vcontrol 92 can be determined based on a distance between the RF power amplifier 690 and a target device (e.g., a base station) of a signal transmitted from the RF power amplifier 690.

Figure 6B:
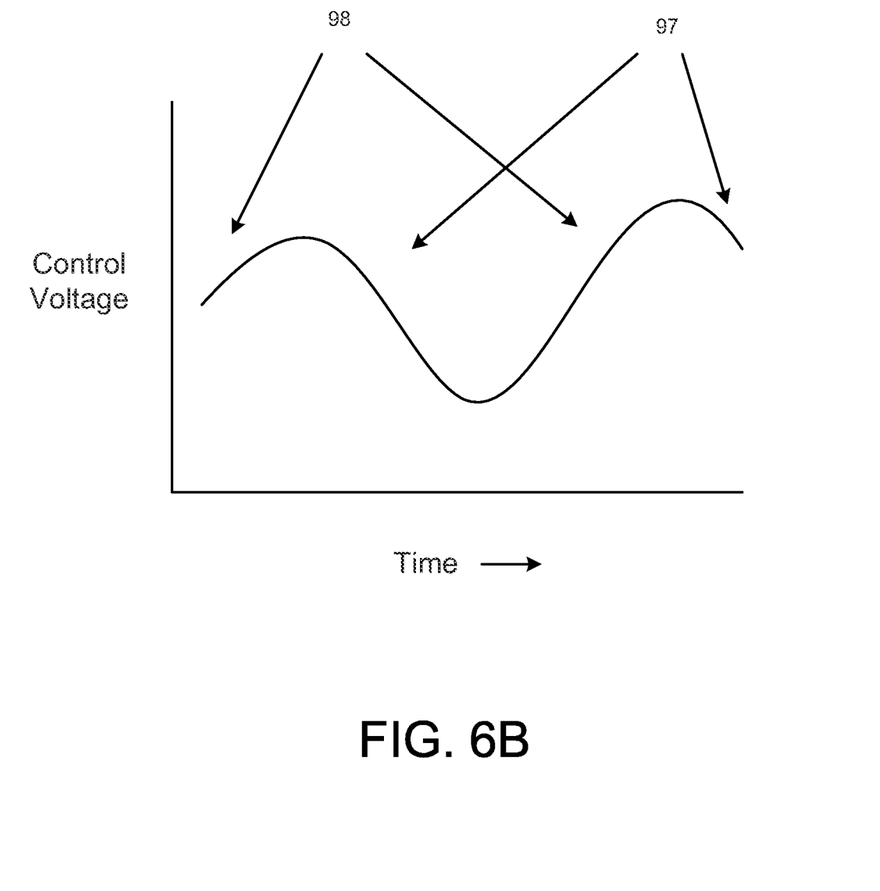
FIG. 6B is a graph that illustrates a dynamically varying control voltage for the switch regulator shown in FIG. 6A.

FIG. 6B is a graph that illustrates a dynamically varying control voltage for the switch regulator 600 shown in FIG. 6A. As shown in FIG. 6B, the control voltage varies between relatively low and relatively high voltages over time. Specifically, the control voltage ramps down 97 (e.g., slews down) from a high voltage to a low voltage, and ramps up 98 (e.g., slews up) from a low voltage to a high voltage. Thus, the control voltage can cause, for example, the output voltage of the switch regulator 600 to ramp down (at a relatively rapid rate) from a high voltage to a low voltage, and to ramp up (at a relatively rapid rate) from a low voltage to a high voltage. In some embodiments, the control voltage can vary between, for example, 0 V and a few voltage (e.g., 1 V, 5 V, 10 V).

In this embodiment, the ramp rate (e.g., slew rate, rate of ramping during ramp up 98, rate of ramping during ramp down 97) of the control voltage shown in FIG. 6B can be slower (e.g., substantially slower) than a rate of switching of the highside switch device 620 and the lowside switch device 630. In other words, the switching frequency of the switch circuit 610, triggered by the control signal 96, can be faster than a frequency that can be associated with changing of the control voltage triggered by Vcontrol 92. In some embodiments, the ramping up 98 and/or ramping down 97 can have a duration of approximately a second or a millisecond while the switching frequency of the switch circuit 610 can be configured to switch at a rate of a few kilohertz or megahertz.

Referring back to FIG. 6A, because the lowside switch device 630 of the switch circuit 610 has a split switch configuration (i.e., the large switch 632 and the small switch 634 with a delayed input produced by the delay circuit. 636), the switch regulator 600 can handle ramping down (e.g., slewing down) of Vout 94 at a relatively high rate in response to ramping down 97 (e.g., relatively rapid ramping down) in Vcontrol 92 (shown in FIG. 6A). In such embodiments, ramping down of Vout 94 can cause a negative current from the inductor 660 into a switch output 612 of the switch circuit 610 toward ground. In particular, in scenarios where a voltage of the switch output 612 of the switch circuit 610 rises (when the highside switch device 620 closes, the lowside switch device 630 opens, and as Vout 94 is ramping down) switching noise (due to a parasitic inductance between the switch output 612 and ground) can be induced at the ground nodes for large switch 632 and/or small switch 634 of the switch circuit 610 that can cause damage to, for example, the switch regulator 600 (e.g., the power source 640 of the switch regulator 600). The split switch in the lowside switch device 630 can increase a time (compared with a single switch) during which the lowside switch device 630 switches from a closed state to an open state. The increase in switching time can decrease (e.g., dampen) the switching noise in a desirable fashion (compared with switching noise that would be present with a shorter switching time).

The decrease in switching noise, using the split switch in the lowside device 630, can be performed in a fashion analogous to that described above in connection with, for example, FIGS. 1 and 2A through 2F. In this scenario, however, the lowside switch device 630 is configured to switch in response to a falling edge of the control signal 96 rather than a rising edge of the control signal 96 (as discussed in connection with FIGS. 1 and 2A through 2F). Although FIGS. 6A and 6B are discussed in the context of an RF power amplifier 690, the principles described herein can be applied to any load with varying power requirements. In particular, the principles described herein can be applied to a ramping down of Vout 94 for any type of load (in response to ramping down of Vcontrol 92) during switching of the switch circuit 610.

In some embodiments, the lowside switch device 630 can be configured so that both switches in the split switch operate only when Vout 94 is ramping down (in response to Vcontrol 92 ramping down). For example, during ramping up (e.g., an increase) of Vout 94, the switch circuit 610 can be configured (e.g., configured using a multiplexer (MUX) or other type of circuit triggered by, for example, the control signal 96) so that only the large switch 632 in the lowside switch device 630 is configured to open and close. During ramping up of Vout 94, the small switch 632 in the lowside switch device 630 can remain open. During ramping down (e.g., a decrease) of Vout 94, the switch circuit 610 can be configured so that the large switch 632 and the small switch 634 of the lowside switch device 630 open and close as described above to dampen switching noise. Similarly, the highside switch device 620 can be configured so that only the large switch 622 of the highside switch device 620 is configured to operate (while the small switch 624 remains open) during ramping down of Vout 94, and both the large switch 622 and small switch 624 can operate during ramping up of Vout 94 to dampen switching noise.

FIG. 7 is a diagram that illustrates a switch regulator 700 that has a switch circuit 710 coupled to filter circuits 760, 762 in a boost regulator configuration. In this embodiment, the filter circuit 760 can function as an input filter circuit, and the filter circuit 762 can function as an output filter circuit. The switch circuit 710 is coupled to a power source 740 via the filter circuit 760 and is coupled to a control circuit 750. As shown in FIG. 7, the filter circuit 760 is configured to receive power 60 (e.g., a voltage, a current) from the power source 740 at a power source output 742. Also, the switch circuit 710 is configured to receive a control signal 64 from the control circuit 750 at a control circuit output 752. The control circuit 750 is configured to trigger the switch circuit 710 to provide the power 60, in a switched fashion, to the filter circuit 762 (and to the load 790) from the power source 740 via the filter circuit 760.

As shown in FIG. 7, the switch circuit 710 includes a highside switch device 720 (e.g., a pull-up switch device) and a lowside switch device 730 (e.g., a pull-down switch device). The control signal 64 produced by the control circuit 750 can be configured to trigger each of the highside switch device 720 and the lowside switch device 730 to switch. In this embodiment, the highside switch device 720 includes a large switch 722, a small switch 724, and a delay circuit 726 (configured to define a delay signal 62). The lowside switch device 730 includes a single switch (e.g., a single transistor device)—lowside switch 732. As shown in FIG. 7, lowside switch 732 can be coupled to a ground (e.g., can be grounded).

In some embodiments, the switch regulator 700 can be modified to define a different type of switch regulator than that shown in FIG. 7. For example, the switch regulator 700 can be modified to include two sets of switch circuits, similar to switch circuit 710, along with other modifications to define a buck-boost regulator and/or so forth.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

In some embodiments, one or more portions of methods may be performed by one or more programmable processors executing a computer program to perform functions by operating on input data and generating output. Portions of methods also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a first switch configured to be coupled to a power source and configured to switch in response to an edge of a control signal;
a delay circuit configured to produce a delay signal that has an edge corresponding to the edge of the control signal, the edge of the delay signal being offset from the edge of the control signal; and
a second switch configured to be coupled to the power source in parallel with the first switch and configured to switch in response to the edge of the delay signal, the second switch having a gate width that is smaller than a gate width of the first switch.

2. The apparatus of claim 1, further comprising a switch output node,
the first switch and the second switch are coupled in parallel to the switch output node, and
the first switch and the second switch are configured to collectively dampen voltage overshoot caused by a parasitic inductance between the power source and at least one of the first switch or the second switch.

3. The apparatus of claim 1, wherein the first switch and the second switch collectively define a switch time period greater than a switch time period of a single switch having a gate width equal to the gate width of the first switch plus the gate width of the second switch.

4. The apparatus of claim 1, wherein:
the first switch is configured to switch from a first state to a second state during a switch time period, and
the second switch is configured to start switching, in response to the edge of the delay signal, during the switch time period.

5. The apparatus of claim 1, wherein:
the first switch is configured to switch from a first state to a second state during a switch time period, and
the delay signal is offset from the edge of an input signal by a duration less than the switch time period.

6. The apparatus of claim 1, further comprising:
a switch output node, the first switch and the second switch being coupled in parallel to the switch output node,
the switch output node being configured to generate a switch output signal which changes between a first state and a second state during a time period starting when the first switch starts to switch and ending when the second switch finishes switching.

7. The apparatus of claim 1, wherein:
the first switch is a p-channel MOSFET device,
the second switch is a p-channel MOSFET device, and
the edge of the control signal is a rising edge and the edge of the delay signal is a rising edge.

8. The apparatus of claim 1, wherein:
the gate width of the second switch is more than ten times smaller than the gate width of the first switch.

9. The apparatus of claim 1, wherein:
the first switch is a first p-channel MOSFET device,
the second switch is a second p-channel MOSFET device, and
the apparatus further comprising:
an n-channel MOSFET device functioning as a pull-down device having a drain coupled to a drain of the first p-channel MOSFET device and a drain of the second p-channel MOSFET device.

10. The apparatus of claim 1, wherein the first switch, the delay circuit, and the second switch define at least a portion of a switch device within a switch regulator.

11. The apparatus of claim 1, wherein:
the delay circuit is a first delay circuit,
the edge of the control signal is a rising edge of the control signal, and
the delay signal is a first delay signal,
the apparatus further comprising:
a switch output node, the first switch and the second switch being coupled in parallel to the switch output node,
a first n-channel MOSFET device configured to be coupled to a ground and configured to switch in response to a falling edge of the control signal;
a second delay circuit configured to produce a second delay signal that has an edge corresponding to the falling edge of the control signal, the edge of the second delay signal being offset from the falling edge of the control signal; and
a second n-channel MOSFET device configured to be coupled to the ground in parallel with the first n-channel MOSFET device and configured to switch in response to the edge of the second delay signal.

12. A method, comprising:
initiating a switch time period of a first switch;
initiating, during the switch time period of the first switch, a switch time period of a second switch offset from, and overlapping with, the switch time period of the first switch, the second switch having a gate width that is smaller than a gate width of the first switch;
receiving, from a power source, a power signal at the first switch and at the second switch; and
producing, starting at a start time of the switch time period of the first switch, a switch output signal based on the power signal and based on a combination of the switch time period of the first switch and the switch time period of the second switch.

13. The method of claim 12, wherein:

the switch time period of the first switch is substantially equal to the switch time period of the second switch, and the switch time period of the second switch is offset from the switch time period of the first switch such that less than all of the switch time period of the second switch overlaps with the switch time period of the first switch.

14. The method of claim 12, further comprising:

receiving a control signal from a signal generator, the initiating the switch time period of the first switch being based on the control signal; and delaying the control signal to produce a delay signal offset from the control signal, the initiating the switch time period of the second switch being based on the delay signal, the delay signal and the control signal having an offset corresponding with an offset between the switch time period of the first switch and the switch time period of the second switch.

15. The method of claim 12, wherein:

the first switch changes from a first state to a second state during the switch time period of the first switch, and the switch time period of the first switch is substantially equal to the switch time period of the second switch.

16. The method of claim 12, further comprising applying the switch output signal to a portion of a buck converter device.

17. The method of claim 12, further comprising:

dampening a voltage overshoot associated with a parasitic inductance of the power source based on the combination of the switch time period of the first switch and the switch time period of the second switch.

18. An apparatus, comprising:

a delay circuit;

a first MOSFET device configured to receive a first current from a power source and configured to switch the first current in response to a control signal received from a control circuit; and a second MOSFET device configured to receive a second current from the power source and configured to switch the second current in response to a delay signal received from the delay circuit, the second MOSFET device having a gate width that is smaller than a gate width of the first MOSFET device, the delay circuit configured to receive the control signal and output the delay signal to the second MOSFET device.

19. The apparatus of claim 18, wherein the delay signal is offset from the control signal so that a switch time period of the second MOSFET device partially overlaps with a switch time period of the first MOSFET device.

20. The apparatus of claim 18, wherein the delay signal is configured to cause the second MOSFET device to begin switching the second current during a switch time period of the first MOSFET device.

\* \* \* \* \*